J. R. L. ALLOTT & E. DEAN.
MEANS FOR ARRESTING VEHICLES ON INCLINED RAILWAYS.
APPLICATION FILED APR. 24, 1916.

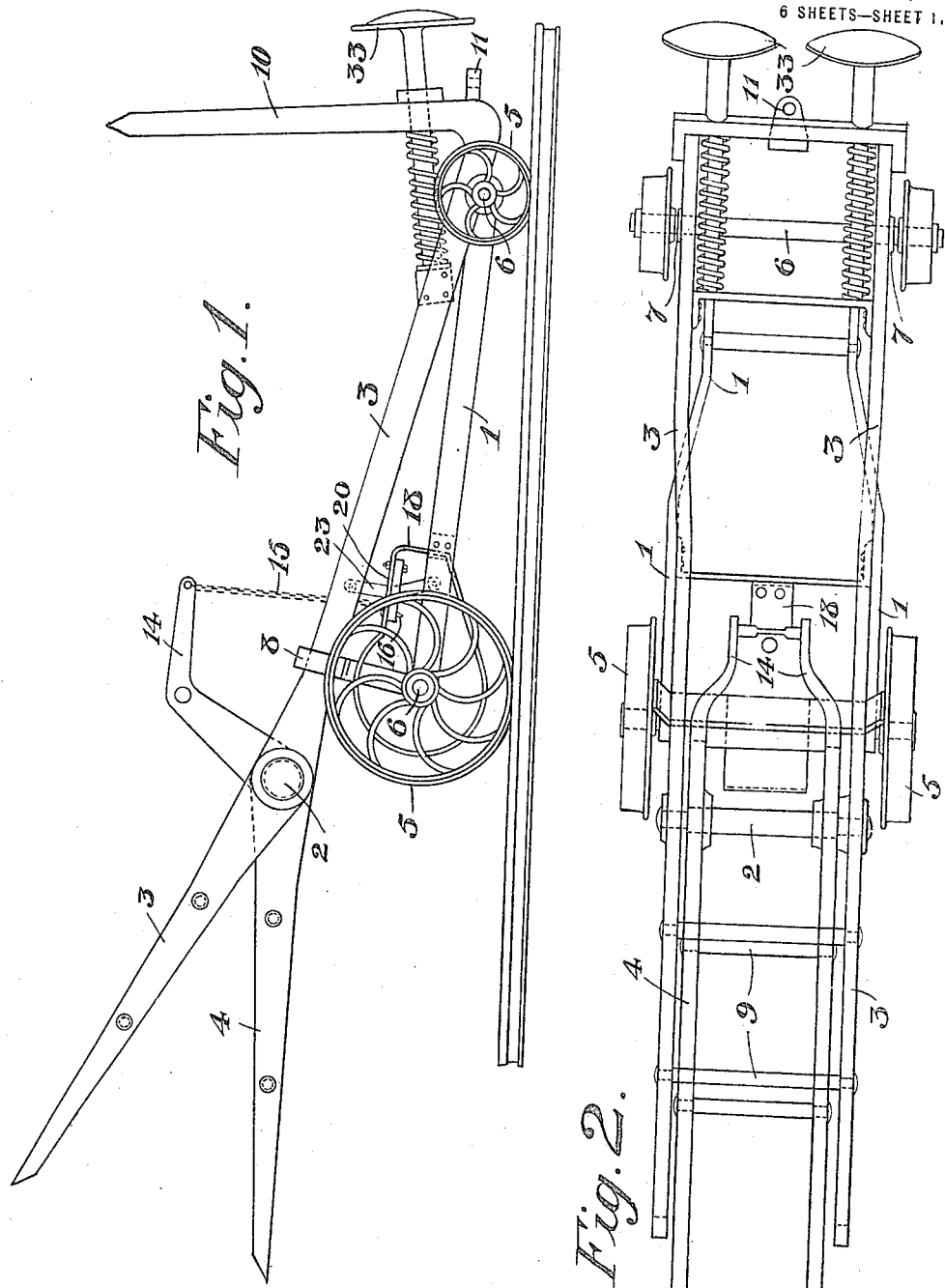

1,254,297.

Patented Jan. 22, 1918.
6 SHEETS—SHEET 2.

Inventors
James Rayney Leach Allott
Ernest Dean,

By Dodge and Sons,
Attorneys

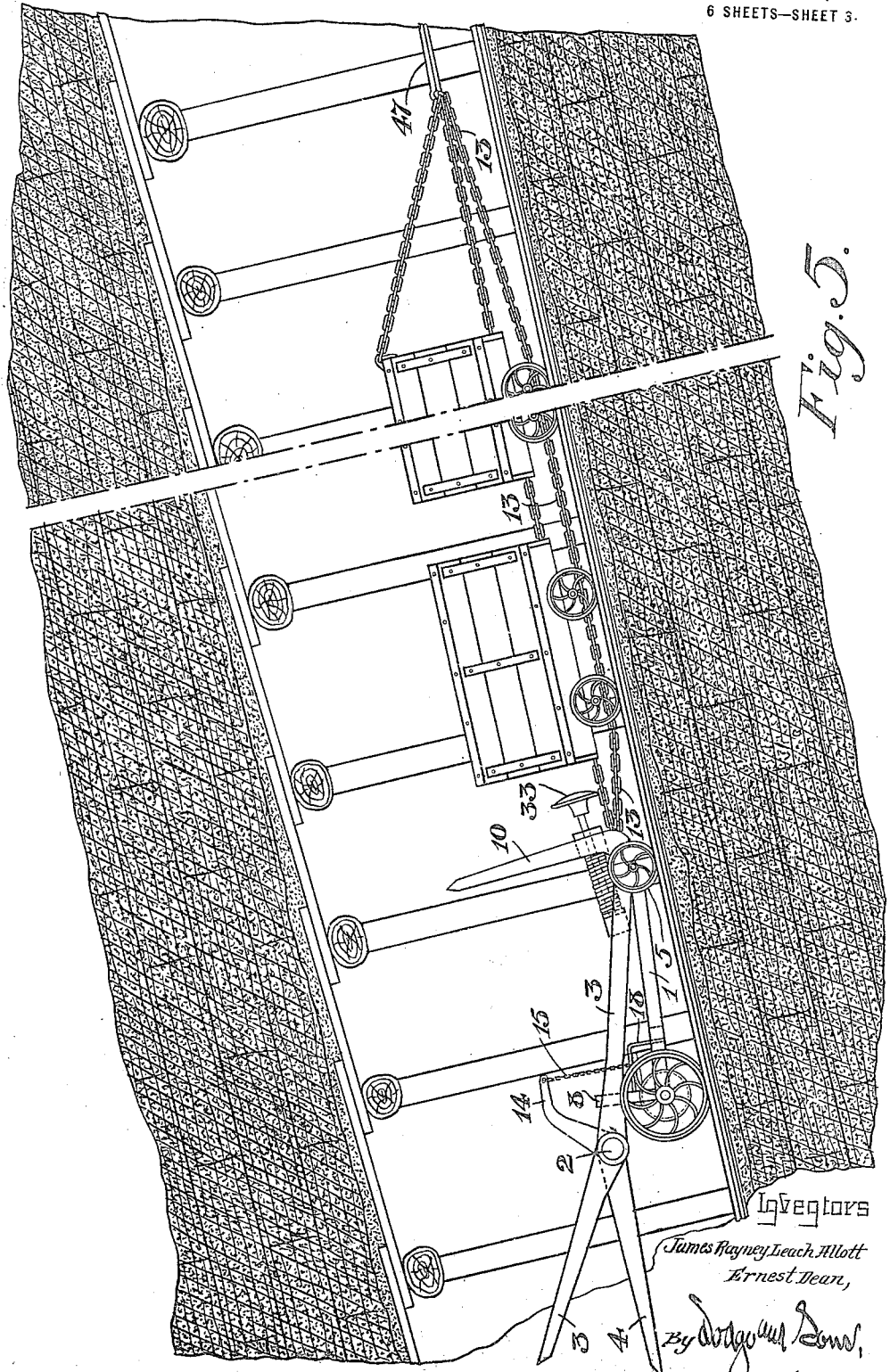

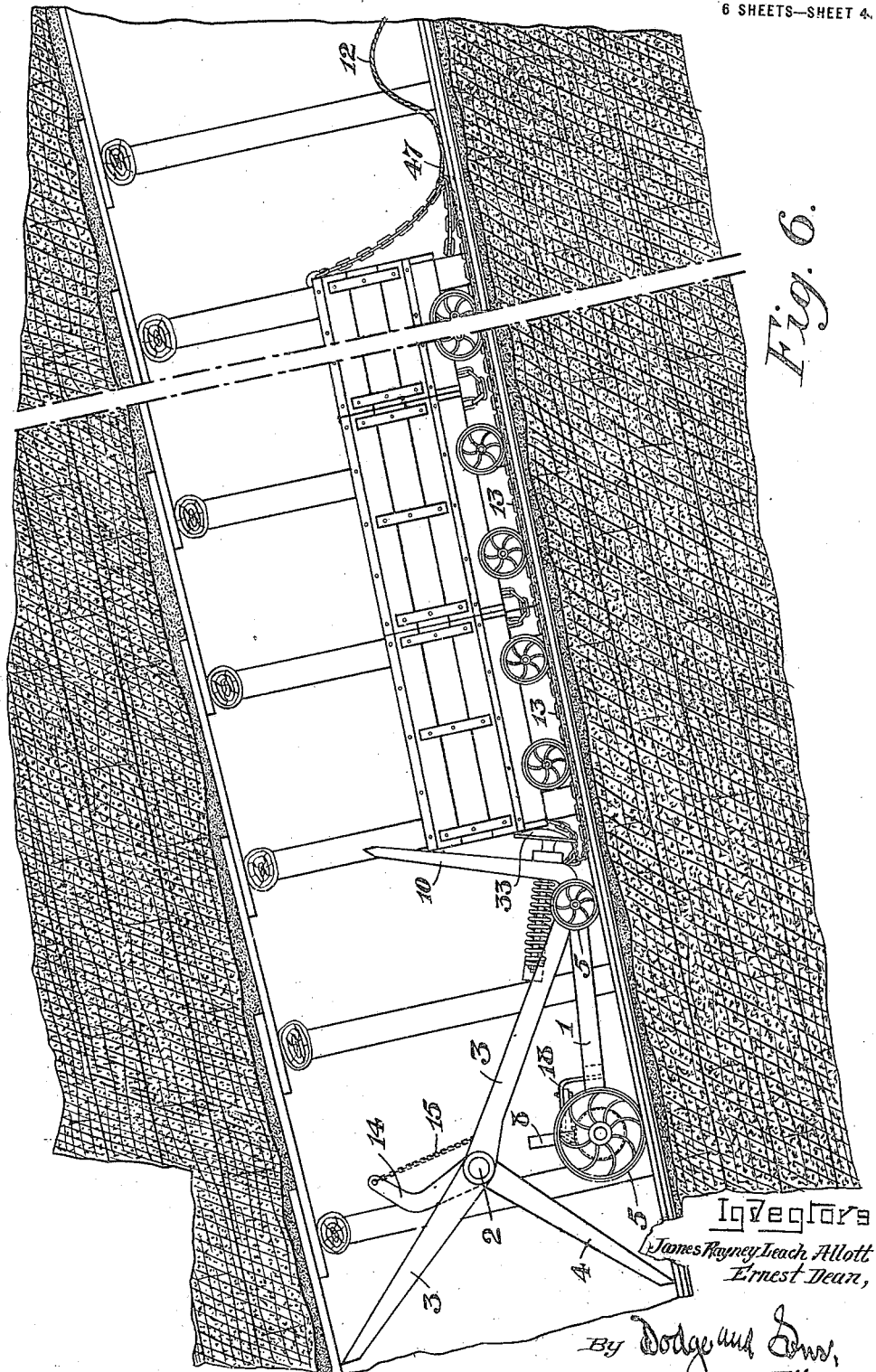

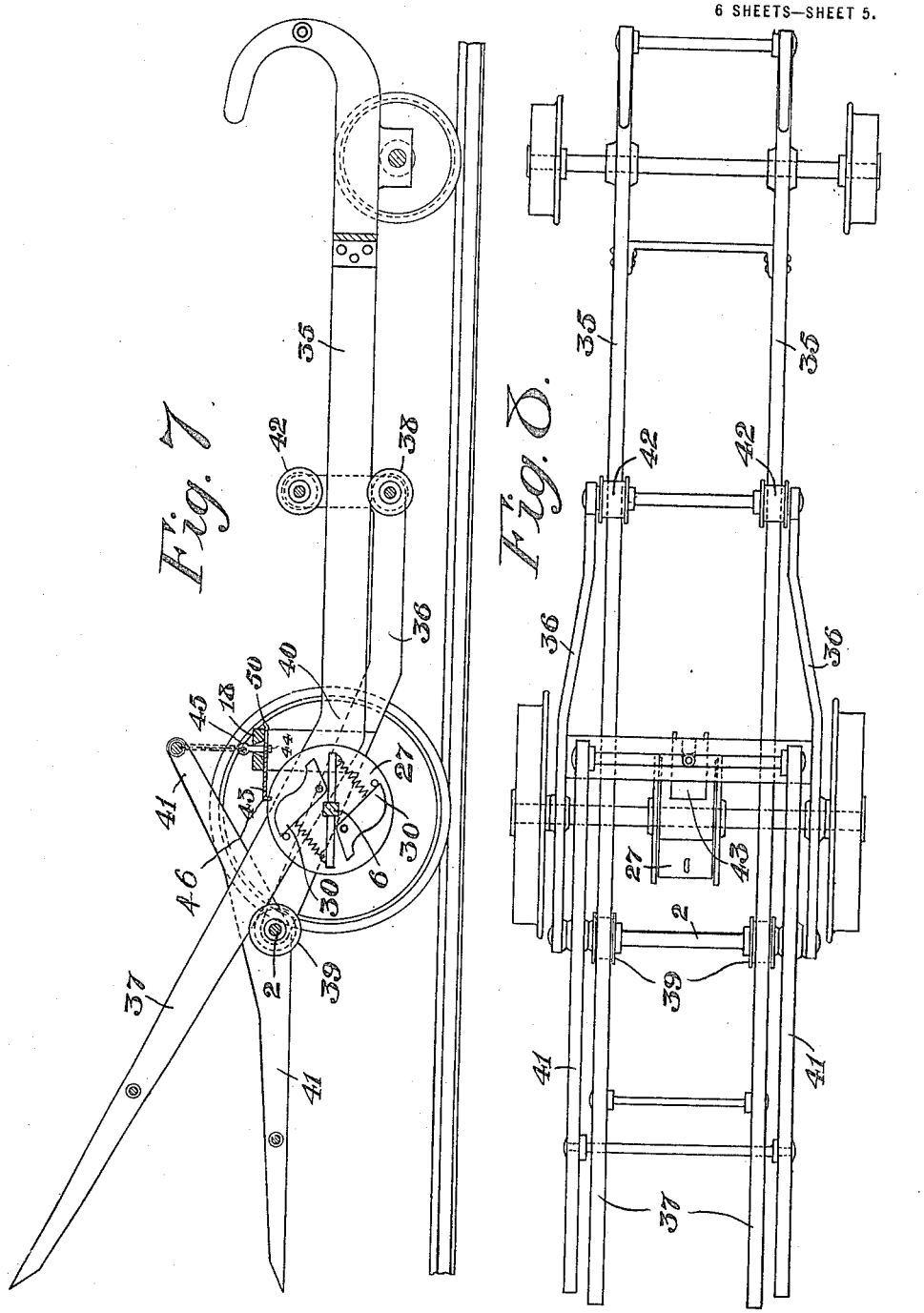

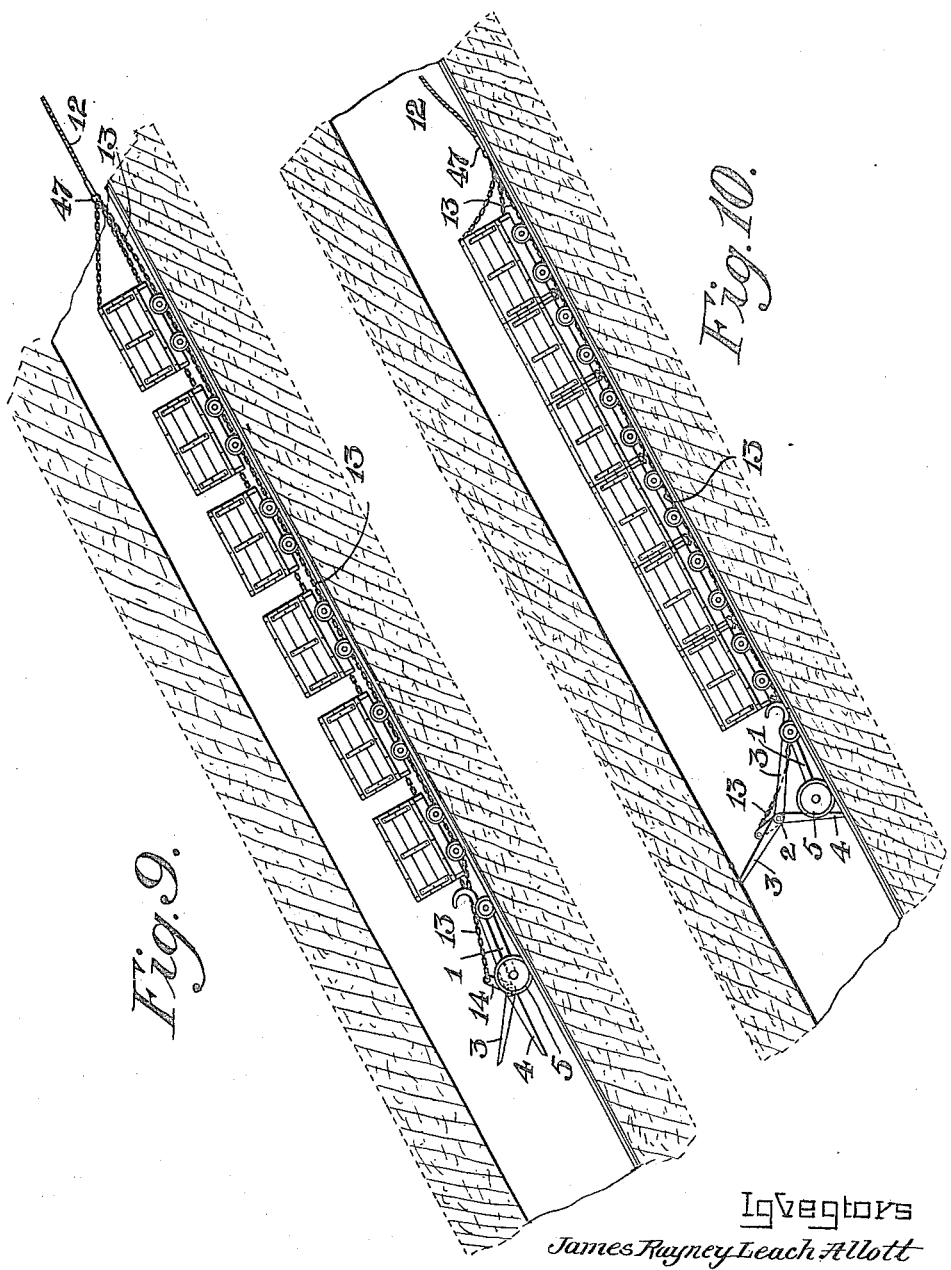

UNITED STATES PATENT OFFICE.

JAMES RAYNEY LEACH ALLOTT AND ERNEST DEAN, OF KIDSGROVE, STOKE-UPON-TRENT, ENGLAND.

MEANS FOR ARRESTING VEHICLES ON INCLINED RAILWAYS.

1,254,297.      Specification of Letters Patent.      Patented Jan. 22, 1918.

Application filed April 24, 1916. Serial No. 93,279.

*To all whom it may concern:*

Be it known that we, JAMES RAYNEY LEACH ALLOTT and ERNEST DEAN, subjects of the King of Great Britain, both residing at Kidsgrove, Stoke-upon-Trent, in the county of Stafford, in the Kingdom of England, have invented certain new and useful Improvements in Means for Arresting Vehicles on Inclined Railways, of which the following is a specification.

This invention has reference to safety sustaining gear for inclined rope railways and the like where the trams or carriages are raised and lowered by ropes or chains. The object of the invention is to provide certain devices which are normally kept out of action, but which should the rope break, or the brakes on the drum fail to act, or the engine-man from any cause lose control of his engine, shall fall into action automatically and prevent the vehicles running back.

Numerous accidents have occurred from time to time in connection with the raising and lowering of men in mines, and the apparatus of the present invention is designed to prevent the trams or vehicles on rope railways in which the men are being carried, from running back down the incline during the ascent or descent should there be a breakage of the haulage rope, or an absence of proper tension thereon.

In the accompanying drawings,

Figure 1 is a side elevation of the safety or brake carriage;
Fig. 2 is a plan view thereof;

Fig 3 a side elevation of the trip gear which renders operative the device that digs into the ground and into the roof when the speed of the vehicles (that is of a governor) reaches or exceeds a given limit;

Fig. 4 is a sectional plan thereof;

Figs. 5, and 6 are views of the invention in actual use, Fig. 5 showing normal working, and Fig. 6 showing the result when the haulage rope breaks;

Fig. 7 is a side elevation and Fig. 8 a plan view of the safety or brake carriage showing a modification.

Figs. 9 and 10 are views showing a modification wherein the governor is dispensed with, and the safety or arresting gear is held out of action by the strain of suspension of the winding rope.

Figure 3:
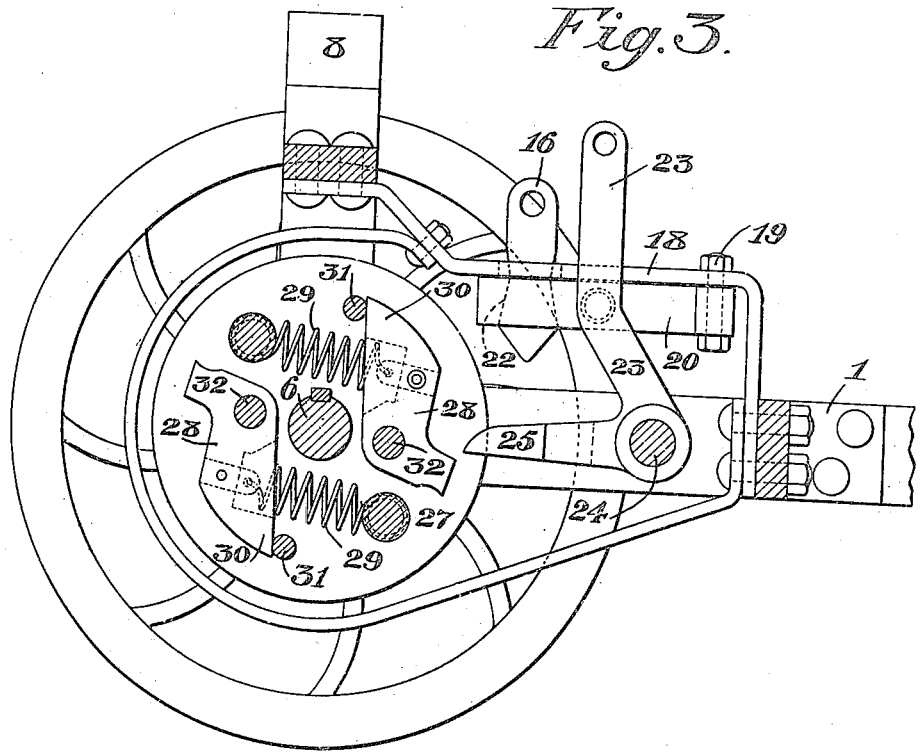

The leading principle of our invention consists in the use or employment of a special safety or brake carriage 1 running on the inclined track, and which is coupled on at the rear end of the tram or vehicle or at the rear of a train of such trams or vehicles for the purpose of retarding or arresting their motion should the hauling rope break or its tension be unduly slackened, and thus prevent them running back. The said carriage carries in a vertically disposed plane, the arms, sprags or levers 3, 4, one or both of these arms being pivotally mounted on or in connection with a horizontally disposed spindle or shaft 2, and normally held clear of the ground and of the roof of the roadway by a chain connection or catch arrangement or otherwise. In the normal position of the parts therefore as shown in Figs. 5 and 9, these arms 3, 4 are held clear of the ground and of the roof but on the severance of the hauling rope or the release of the proper tension thereon, or the breakage of the connection between the vehicles, one of these arms falls and the other rises so that their ends will respectively dig or embed themselves into the ground and into the roof of the roadway, as shown in Figs. 6 and 10, thus acting as sprags which exert a braking or stopping action, and bringing the trams or vehicles to a standstill.

There are several modes by which this idea when once explained in this way may be carried into effect. We will give one or two examples.

Figure 4:
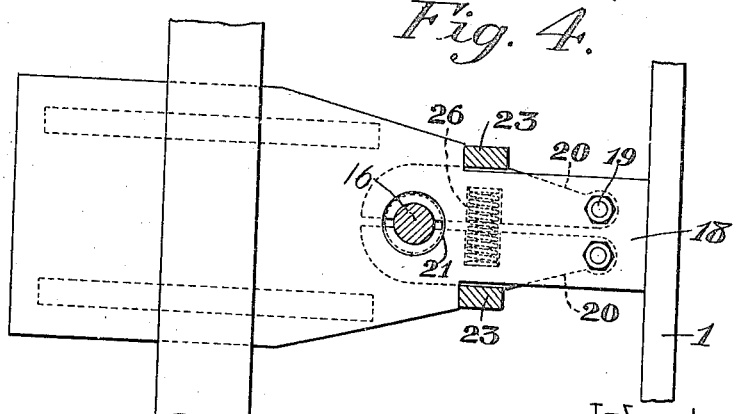

Referring first to Figs. 1 to 6 inclusive, the carriage that runs on the inclined track and is coupled on at the rear of the trams or vehicles may comprise a frame 1 having wheels 5 and axles 6 journaled in the bearings 7, the said frame having a cradle member 8 at its rear end. This carriage is provided with a pair of arms or sprags 3, 4, which are so pivoted together scissors fashion by the horizontal spindle 2 that normally they are closed toward one another, but when operated these two arms open outward or spread apart, the end of one of them digging into the ground, and the end of the other digging into the roof of the roadway, so as to bring the vehicles quickly to a standstill. The said arm or sprag 3 is fulcrumed on the forward axle, and rests on the cradle member 8 of the framework 1 of the carriage at the rear when in the inoperative position. The other arm or sprag 4 is pivotally mounted on the first mentioned arm or sprag 3 by means of the spindle 2 at the rear end of the carriage. Each arm or sprag 3, 4 is made of a pair of prongs or members stayed together by cross pieces such as 9 for the purposes of strength. One pair of these arms or sprags namely 3 extends the full length of the carriage and at the rear end extends beyond it, and is preferably inclined upward, while at the forward end, said arms are preferably bent upward to form upstanding members 10. The upstanding members 10 are provided with buffers, and a cross bar by which the upstanding parts are stayed together with means such as the eye piece 11 to which the coupling chain of the last vehicle in the train is attached, and to which also a tail rope or chain 13 may be coupled, the said chain being secured to the hauling rope 12 at the coupling. The arm or sprag 4 extends to the rear considerably beyond the pivotal point 2, while at the forward side of the pivot point it is bent upward at an angle to form a crank 14 and has coupled to it a chain 15 at the lower end of which is a catch bolt 16 passing through a hole in a suitable bracket 18 on the carriage 1. Resting against the under side of this bracket 18 and pivoted thereto at 19, are a pair of jaws 20, whose opposing edges are provided with recesses 21 adapted to take on to a groove or reduced portion 22 in the catch bolt 16, when the two jaws are closed together, and thus hold up the projecting end of the pivoted arm or lever 4 clear of the ground. These jaws 20 are normally held closed together between a pair of spaced arms 23 of a bell-crank, which is pivoted at 24 to the frame 1 of the carriage, but whenever the speed of the vehicle (that is of a governor 27) reaches or exceeds a given limit, this bell-crank is tripped on its axis 24 by the governor coming in contact with its arm 25, whereupon the said jaws 20 are pushed apart by the springs 26, and the catch bolt is released. The catch bolt 16 is thus held locked when engaged by the jaws 20, but released when the bell-crank arm 25 is tripped by the governor.

The governor 27 which is applied to the rear axle 6 of the carriage, is set for a given speed and is driven direct from the axle. This governor may be of any suitable type, a convenient arrangement being to provide a pair of pivoted levers 28 controlled by springs 29 or weights and provided with tappets 30 at one end which normally rest against the abutments 31. These levers 28 besides being pivoted on their own axes 32 revolve around the axle 6, so that the ends which carry the tappets 30 swing outward by centrifugal force when the speed of the axle (when rotating in one direction) exceeds a given limit. The greater the speed, the greater the centrifugal force, and consequently the farther do the tappets 30 depart from the axis of rotation 6, until one or other of them impacts against the arm 25 of the bell crank, thus tripping it and releasing the catch bolt 16. Instantaneously the projecting end of one pivoted arm or sprag 4 falls by gravity to the ground, thus acting as a brake or stop to prevent the descent of the carriage, and consequently of the trams or vehicles in front of it. Simultaneously the digging of this arm or lever 4 into the ground, will lift the other lever 3 off its seating 8 on the carriage and cause it to swing or rear upward on its fulcrum so that its upper end will dig into the roof of the roadway. In other words the two pairs of arms or sprags 3, 4, will open outward or spread apart, the outer ends of one pair digging into the ground, and the outer ends of the other pair digging into the roof so that the carriage, and the trams or vehicles in front of it are brought to a standstill within a few inches or at any rate a very short distance before being arrested. The spring buffers 33 at the forward end of the carriage ease the impact, when the trams or vehicles run into them, on the carriage being brought to a standstill. Thus the loss of life to those in the trams or vehicles, or to those who happen to be at the bottom of the incline, is prevented should the hauling rope break or get out of proper tension. When however the rope is hauling or lowering the trams or vehicles at normal speed, then the governor runs clear of the bell crank arm 25 and the travel of the trams or vehicles is not stopped because the arm 25 is not caught by the tappets on the governor. It will be noticed that when the sprag 3 is lifted off its seating and digs into the roof, the upstanding member 10 is swung forward, so that while the headstock of the rearmost tram impacts against the buffers 33, the upper part of the tram impacts against the member 10, and absolutely prevents the trams mounting on top of the safety carriage which thus constitutes a complete preventive to the trams running back should the rope break or the brakes fail to act, or the engineman from any cause lose control of his engine. The spaced arms 23 may be extended upward as shown, so as to enable a man riding on the last vehicle to operate these arms by hand, and thus put the gear into operation.

Centrifugal force will cause the tappets 30 to swing outward irrespective of the direction of rotation. In the arrangement shown, such tappets however only effectively engage the arm 25 of the bell crank when rotating in one direction around the axis 6, the impacting edges of the tappets 30 and the arm 25 forming abutments, while the opposite edges are chamfered.

Another plan shown in Figs. 7 and 8 which may be adopted, consists in making one of the arms or sprags namely 37 as an extension of the carriage 35 which at the fore end is fulcrumed on the forward axle. In this modification, the framework 35 of the carriage is supported at the rear end upon a pair of longitudinal cradle bars 36 which are journaled to the rear axle. The framework 35 of the carriage at the rear is bent or inclined upward, and the under edge of this inclined part and of their extensions 37 form an inclined plane, or a plane which lies at an angle with respect to the other part of the framework of the carriage. The cradle bars 36 are journaled to the axle at a suitable point between their two ends, while at each end the cradle bars are provided with grooved rollers 38, 39 which form the support upon which the framework 35 of the carriage rests, the under edge of the main part 35 of the framework resting on one pair of rollers 38, and the under edge of the arms 37, that are adapted (when operated) to dig into the roof, resting on the other pair of rollers 39, the point 40 where the main framework is bent lying normally midway between the two pairs of rollers 38 and 39. At the rear end of these cradle bars 36 (and preferably on the same axis as the rollers 39) are pivotally mounted (by means of the spindle 2), the arms 41 which when operated dig into the ground, the latter being held up clear of the ground by a catch arrangement such as that already described, except that the bracket 18 is in this instance secured to the cradle bars 36, and not to the framework of the carriage. The cradle bars 36 at their rear ends are also bent upward at an angle, so as to lie at an angle with respect to the fore part. It will thus be seen that the framework 35 of the carriage is journaled at the fore end on the axle and is supported at the rear on the cradle bars 36, and although the bend 40 in the framework is maintained normally midway between the two pairs of rollers 38 and 39, yet when force is applied by the digging of the arms 41 into the ground, the cradle bars 36 together with the rear axle and the catch arrangement, will be forced forward toward the front axle, the rollers 38 and 39 on the cradle bars rolling along the under edges of the frame 35 which form trackways. In order to steady the cradle 36, the said cradle at the fore end is preferably provided not only with rollers 38 upon which the lower edge of the carriage framework rests, but also with rollers 42 which come against the upper edge as well.

It will be understood that any suitable catch arrangement may be used which will normally hold the scissors arms out of operation, but which will be automatically tripped when the speed of the vehicle (that is of the governor) reaches or exceeds a given amount. Thus in this figure an alternative arrangement is shown, in which 43 is a sliding bar resting on the underside of the bracket 18, the said bar being forked at one end so as to engage the groove or notch 44 in the catch bolt 45 and hold up the projecting end of the pivoted arm or lever 41 clear of the ground. The catch bar has a beak 46 at the other end, and the catch bolt 45 is disengaged from the catch bar when the latter is drawn longitudinally, thus releasing the catch bolt, and allowing the end of the pivoted arm or sprag to fall to the ground. This catch bar is drawn longitudinally to release the said arm or sprag whenever the speed of the vehicle, that is of the governor 27, reaches or exceeds a given limit. In action therefore, when the governor tappets 30 depart sufficiently far from the axis of rotation to impact against the beak 46 at the end of the catch bar 43 and release the catch bolt 45, the projecting end 41 of the lower of the arms or sprags falls to the ground, thus acting as a brake or stop to prevent the descent of the carriage and of the trams or vehicles in front thereof, and simultaneously the digging of these arms or sprags 41 into the ground, will cause the cradle bars 36 together with the axle to which they are journaled to travel forward or approach nearer to the front axle, thus tilting or rearing the entire framework 35 of the carriage upward on its fulcrum namely the fore axle, so that the inclined arms or sprags 37 at their upper end will dig into the roof of the roadway. The governor 27 is of course so arranged as not to operate the catch bar 43 when the trams or vehicles and the carriage are ascending the incline, even though the speed of such ascent be excessive. The operation takes place only when the carriage descends too rapidly, or when in the ascent the hauling rope breaks or the tension is unduly slackened and the carriage begins to run back. 50 is a small check piece on the catch bar to prevent the latter being accidentally withdrawn.

These two arrangements are given simply as examples to show the working of our invention, but modifications can be made, which while they might change the appearance of the apparatus, would not be a departure from the scope of the invention herein set forth. For instance the governor might be dispensed with and the pair of arms or sprags held out of action, that is clear of the ground and of the roof, by means of the hauling rope. A convenient arrangement would be as shown in Figs. 9 and 10 to attach the hauling rope 12 to a train of trams on an incline, with the safety carriage coupled behind them. A supplementary rope 13 under the trams would be fastened at one end to the haulage rope near the capping 47, and at the other end to the arm 14 of the sprag on the carriage, the length of this supplementary rope 13 being such that it is in tension when the haulage rope 12 is taut, so as to keep the arms or sprags out of action. So long as the haulage rope 12 is taut therefore the arms or sprags are held clear of the ground and roof, but if the rope breaks or becomes slack the supplementary rope 13 becomes slack also, and the said arms or sprags come into action, and quickly act to bring the carriage to a standstill and prevent the trams or vehicles from running back down the incline. The arrangement without the governor, would be adapted more especially for moderate inclines, but for steep inclines the use of a governor is desirable.

In cases where the appliance is used on inclines for drawing minerals only, the lower arm or sprag might be left to trail on the ground all the way up the incline, so that in case of breakage of the hauling rope the end of the lower arm being on the ground would arrest backward running, while the upper arm would immediately rear up and also stop the tubs from running back. In this modification when empties are being lowered down the incline the lower arm would be simply held up by a chain.
If the apparatus was used in this way there would be no security in case of breakage of the haulage rope on the down journey, but the protection given on the up journey may be sufficient in many cases, particularly as breakages take place usually during the ascent. To make such arrangement effective down hill, the chain that holds up the arms or sprags would be hooked on to the top of the last tub, so that a guard riding on the last tub could release it, and so bring the arms into operation.

Another instance of a modification which would not be a departure from the scope of the invention herein set forth, consists in journaling the spindle 2 in fixed bearings on the carriage, in which case one of the arms or sprags would fall by gravity to the ground when released, and the other one raised by a weight or spring into contact with the roof of the roadway, there being in such case no tilting or rearing upward of the arms or sprags on their fulcrums.

We declare that what we claim is:—

1. A holding device for vehicles on inclined railways running in tunnels, comprising in combination, a carriage adapted to run in said tunnel and to be coupled with a vehicle; sprags so pivotally mounted on said carriage that their ends project from the rear thereof; means for normally holding the rear ends of said sprags closed toward one another, whereby they do not obstruct the movement of the vehicle; and means operable upon the breaking or release of the haulage rope, for causing said sprags to open outward and engage the walls of the tunnel.

2. Means or devices for holding the vehicles on inclined rope railways stationary on the severance of the rope, comprising in combination a carriage adapted to run on the inclined track, a rearwardly projecting arm or sprag fulcrumed on the forward axle of the carriage, a second arm or sprag pivotally connected with the first mentioned arm or sprag and means for holding the said arm clear of the ground or for releasing the same to allow it to dig into the roadway, its impact with the roadway causing the first mentioned arm or sprag to swing upward on its fulcrum into impact with the roof.

3. Means or devices for holding the vehicles on inclined rope railways stationary on the severance of the rope, comprising in combination a carriage adapted to run on the inclined track and to be coupled on at the rear of the train of vehicles, a horizontally disposed spindle, arms or sprags pivotally connected therewith scissors fashion and in a vertically disposed plane in such manner that when closed toward one another they lie clear of the ground and of the roof, but when opened outward their ends embed themselves in the ground and roof of the roadway respectively.

4. Means or devices for holding the vehicles on inclined rope railways stationary on the severance of the rope, comprising in combination a carriage adapted to run on the inclined track, a horizontally disposed spindle, arms or sprags pivotally connected with the said spindle scissors fashion and in a vertically disposed plane or planes, a catch device for holding the said arms or sprags closed toward one another, and a governor so mounted on or in rotating connection with the carriage axle, that its arms trip the said catch device whenever the speed of the carriage becomes abnormal, thus releasing the sprags and putting them into action.

5. A safety apparatus for inclined rope railways, comprising in combination a carriage adapted to run on the inclined track and to be coupled on at the rear of the train of vehicles, a horizontally disposed spindle, arms or sprags so pivotally mounted thereon in a vertically disposed plane, that their ends project from the rear of the carriage, the said arms forming no obstruction to the vehicles moving up the track or down it when the lower scissors arm is raised but upon the said lower arm being released it will dig into the ground, and cause the other arm to swing or rear upward so that it will dig into the roof.

6. A safety apparatus for inclined rope railways comprising, in combination, a carriage adapted to run on an inclined track;

a pair of sprags pivoted together scissors fashion, the end of one sprag being fulcrumed on the forward axle, the rear part of said sprag normally resting upon the framework of the carriage at the rear, and the other sprag being pivoted to the first-mentioned sprag near the rear of the carriage; and releasable means for normally holding said second sprag in a raised position.

7. A safety apparatus for inclined rope railways, comprising in combination a carriage adapted to run on the inclined track, and consisting of a frame mounted on wheels and axles and provided with a cradle member at its rear end, and a pair of arms or sprags pivoted together scissors fashion and fulcrumed on the forward axle, the said arms or sprags projecting from the rear of the carriage and adapted to normally rest in their inoperative position on the cradle.

8. In safety apparatus for arresting vehicles on inclined rope railways when accidentally released, the combination with a carriage adapted to run on the inclined track of a pair of arms or sprags pivoted together scissors fashion on the carriage, a locking device or clutch for holding the arms out of action when the vehicles are moving up or down the track in the usual way, and a governor so mounted on and in rotating connection with the carriage axle that its arms whenever they depart more than a given distance from the axis of rotation, trip the locking device or clutch and put the arms or sprags into action.

9. In safety apparatus for arresting vehicles on inclined rope railways when accidentally released, the combination with a carriage adapted to run on the inclined track, of a pair of arms or sprags pivotally mounted on the carriage, a catch bolt so connected to the arms or levers as to normally hold them out of action, a pair of jaws adapted to clutch the catch bolt when closed together, a bell crank whose arms at one side of its pivot are adapted to hold the jaws in the closed position, and a governor so mounted on or in rotating connection with the carriage axle that its arms trip the said bell crank whenever the speed becomes abnormal, thus releasing the jaws and putting the sprags into action.

10. A safety apparatus for arresting vehicles on inclined rope railways when accidentally released, comprising in combination a carriage adapted to run on the inclined track, a member mounted on the carriage which on the severance of the rope or the release of the proper tension exercised thereon is adapted to swing or cant upward at the rear, arms or sprags carried on the said member at the rear end, supplementary sprags pivotally disposed in connection with the first named ones, and an upstanding part carried by the said member at the fore end, so arranged as to cant forward when the member is canted upward.

In witness whereof, we have hereunto signed our names this 7th day of April 1916, in the presence of two subscribing witnesses.

JAMES RAYNEY LEACH ALLOTT.
ERNEST DEAN.

Witnesses:
ALFRED LAWTON LOVATT,
JABEZ CLARE.

Copies of this patent may be obtained for five cents each, by addressing the "Commissioner of Patents, Washington, D. C."